US007177870B2

(12) United States Patent
Jokela et al.

(10) Patent No.: US 7,177,870 B2
(45) Date of Patent: Feb. 13, 2007

(54) METHOD OF DATA BLOCK AGGREGATION

(75) Inventors: Sami Santeri Jokela, Helsinki (FI); Lucian P. Hughes, Montara, CA (US)

(73) Assignee: Accenture Global Services GmbH (CH)

( * ) Notice: Subject to any disclaimer, the term of this patent is extended or adjusted under 35 U.S.C. 154(b) by 354 days.

(21) Appl. No.: 10/156,973

(22) Filed: May 29, 2002

(65) Prior Publication Data

US 2002/0184247 A1 Dec. 5, 2002

Related U.S. Application Data

(60) Provisional application No. 60/294,436, filed on May 30, 2001.

(51) Int. Cl.
*G06F 17/30* (2006.01)
*G06F 7/00* (2006.01)

(52) U.S. Cl. ......................... 707/10; 707/101; 707/204

(58) Field of Classification Search ................ 707/204, 707/1, 10, 101; 705/1, 37, 224; 709/224, 709/246

See application file for complete search history.

(56) References Cited

U.S. PATENT DOCUMENTS

| | | | | |
|---|---|---|---|---|
| 6,094,662 | A * | 7/2000 | Hawes | 707/104.1 |
| 6,148,330 | A | 11/2000 | Puri et al. | 709/217 |
| 6,247,050 | B1 * | 6/2001 | Tso et al. | 709/224 |
| 6,477,575 | B1 * | 11/2002 | Koeppel et al. | 709/224 |
| 6,493,733 | B1 * | 12/2002 | Pollack et al. | 715/513 |
| 2002/0078102 | A1 * | 6/2002 | Dutta | 707/526 |
| 2002/0099562 | A1 * | 7/2002 | Bruce et al. | 705/1 |
| 2002/0105648 | A1 * | 8/2002 | Nara et al. | 356/394 |
| 2002/0120779 | A1 * | 8/2002 | Teeple et al. | 709/246 |
| 2002/0123334 | A1 * | 9/2002 | Borger et al. | 455/419 |
| 2002/0161634 | A1 * | 10/2002 | Kaars | 705/14 |
| 2002/0169706 | A1 * | 11/2002 | Chandra et al. | 705/37 |
| 2003/0105648 | A1 * | 6/2003 | Schurenberg et al. | 705/2 |
| 2003/0135853 | A1 * | 7/2003 | Goldman et al. | 725/34 |
| 2004/0205564 | A1 * | 10/2004 | Brayton et al. | 715/513 |

OTHER PUBLICATIONS

S. Jokela, M. Turpeinen, R. Sulonen, "Ontology Development for Flexible Content," 2000 IEEE, Proceedings of the 33rd Hawaii International Conference on System Sciences, pp. 1-10.

(Continued)

*Primary Examiner*—John Cottingham
*Assistant Examiner*—Kuen S. Lu
(74) *Attorney, Agent, or Firm*—Fish & Richardson P.C.

(57) ABSTRACT

Techniques for providing blocks of data to a remote computer system for insertion into a computer-generated document residing on the remote computer system. The techniques include identifying, in the central network-accessible computer system, a plurality of blocks of data, a source for obtaining current data for each of the blocks of data, and an identifier that uniquely identifies each of the blocks of data In response to a request from the remote computer system received by the central network-accessible computer system for current data for a specified one of the plurality of blocks of data, the central network-accessible computer system transmits the requested current data for the block of data from the central network-accessible computer system to the remote computer system for insertion into a computer-generated document residing on the remote computer system.

39 Claims, 8 Drawing Sheets

OTHER PUBLICATIONS

S. Jokela, M. Turpeinen, T. Kurki, E. Savia, R. Sulonen, "The Role of Structured Content in a Personalized News Service," 10 pp.

E. Savia, T. Kurki, S. Jokela, "Metadata Based Matching of Documents and User Profiles," 9 pp.

T. Kurki, S. Jokela, R. Sulonen, "Agents in Delivering Personalized Content Based on Semantic Metadata," 1998, American Association for Artificial Intelligence, 10 pp.

S. Jokela, J. Saarela, "A Reference Model for Flexible Content Development," 15 pp.

"Web-based device monitoring and control" by R. Snell, Proceedings of the Annual Embedded Systems Conference, Mar. 1, 1999, pp. 283-294, XP002148359.

* cited by examiner

METHOD OF DATA BLOCK AGGREGATION

This application claims priority from U.S. provisional patent application No. 60/294,436 filed on May 30, 2001.

TECHNICAL FIELD

This invention relates to information management systems, and more particularly to a method for aggregating data blocks and making the data blocks available for retrieval by a remote computer system.

BACKGROUND

Electronic information management systems often employ an internal database of information that may be retrieved and input into various computer applications by a user. A user will often retrieve only small portions of information from the internal database and transfer the desired portion of information into the user's computer application. However, when the user requires only small pieces of information from an external source, such as an internet website, an independent research report, or government statistical data, then the user must independently research and retrieve the desired information from each external source, and input the pieces of information into the user's computer application. The research and retrieval of the desired information may be time-consuming, costly, or redundant depending on the nature of the information.

In a typical example, research reports from professional organizations may be sold to the public, yet a user may desire only a small portion of information, such as only the conclusion or figures. The user may purchase the entire research report in order to obtain only the small portion of information that is desired, which may be an expensive option. A better solution for the user may be to obtain a tool that allows the user to purchase and automatically retrieve only the small portions of information that is desired from the external sources instead of paying for the entire research report.

In another example, the information that is researched and retrieved from external sources by the user may be continually changing information, such as weather reports, currency exchange rates, pricing information, or news headlines. To ensure that the data input into the computer application is updated correctly, the user must continually research and retrieve the desired information from the same external data sources on a repetitive basis and input the updated data into the computer application. Also, if the user is creating a data-intensive document that requires small portions of information from many different external sources, the research and retrieval may be very laborious and time-consuming. It would be advantageous to the user to obtain a tool that is able to continually update pieces of data that are input into the computer application and simplify the research and retrieval process for small pieces of information from many different external sources. A need exists for a tool that may be used to import readily available, useful pieces of information into computer applications, which may be automatically updated.

SUMMARY

In general, the invention is directed toward improvements in the method of information management that enables simplified research and retrieval of data for individual users. The current invention is concentrated in managing useful pieces of information from external data sources instead of whole documents, and making the pieces of information easily accessible to individual users.

A method for providing blocks of data to a remote computer system for insertion into a computer-generated document residing on the remote computer system includes identifying, in a central network-accessible computer system, a plurality of blocks of data, a source for obtaining current data for each of the blocks of data, and an identifier that uniquely identifies each of the blocks of data. The method also comprises, in response to a request from the remote computer system received by the central network-accessible computer system for current data for a specified one of the plurality of blocks of data, transmitting the requested current data for the block of data from the central network-accessible computer system to the remote computer system for insertion into a computer-generated document residing on the remote computer system.

The pieces of information from the external data sources are retrieved by the central network-accessible computer system, which is referred to as an aggregator. Some or all of the information syndicated from external data sources may be made available by the external sources under agreement with an operator of the aggregator. The individual users may receive access to the data blocks of the aggregator by subscribing to the services of the aggregator. The invention may include one or more of the following advantages. First, the invention provides users a data market that allows users to buy valuable and useful pieces of information to their applications. Also, the current invention saves time and expenses by providing hard to find pieces of information, data that is updated frequently, and pieces of information from many different external sources direct to the users computer systems. Another advantage is that the invention provides only the pieces of information that are relevant to the individual user, not entire documents, and the relevant pieces of information are transmitted to the user in a usable electronic format. The details of one or more embodiments of the invention are set forth in the accompanying drawings and the description below. Other features, objects, and advantages of the invention will be apparent from the description and drawings.

DESCRIPTION OF DRAWINGS

Like reference symbols in the various drawings indicate like elements.

DETAILED DESCRIPTION

Figure 1:
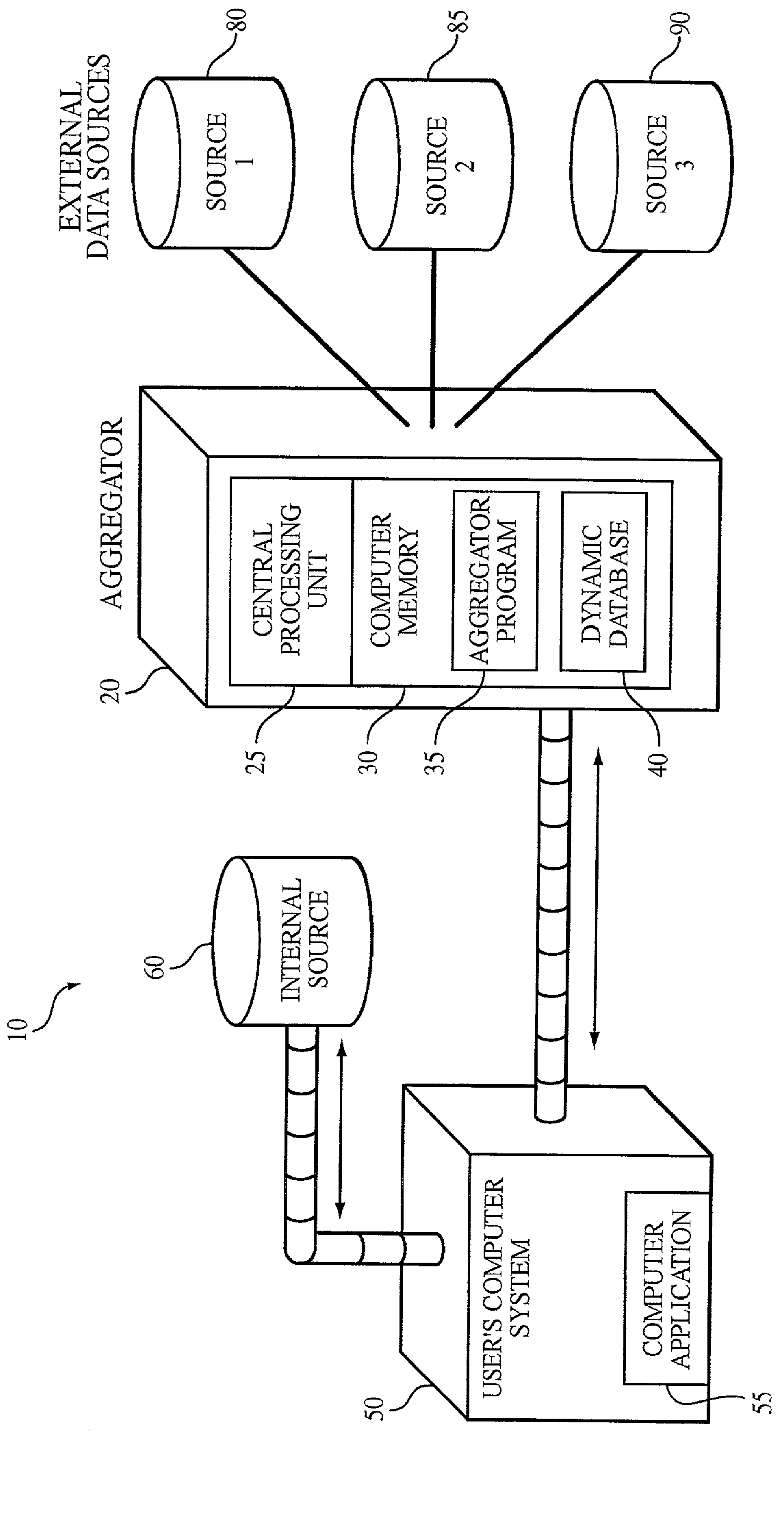
FIG. 1 is a diagram of an information management system using a data block aggregator in accordance with the invention.

An information management system 10 in accordance with the invention, shown in FIG. 1, includes an aggregator 20 that is network connected to various external data sources 80, 85 and 90. The aggregator 20 is also network accessible by a user's remote computer system 50. The aggregator 20 shown in this embodiment includes a central processing unit

25 and computer memory 30 with a database 40 stored in the memory 30. The aggregator 20 serves as a centralized source for users to access various pieces of information, referred to as data blocks. Some examples of data blocks may be the current temperature in a certain city, a current stock price for a specific company, and market statistics derived from an industry report.

Also stored in memory is a computer program 35 that performs two primary functions. First, the computer program 35 controls the retrieval of information stored at the various external sources 80, 85 and 90, and the aggregation of that information into the database 40. Second, the computer program 35 controls, upon receipt of a command for a specified data block stored in the database 40 from the user's computer system 50, the delivery of the specified data block to the user's computer system 50. The network connections to the external sources 80, 85, and 90 may be secured connections or unsecured connections depending on the information that is provided. Some or all of the information syndicated from the external sources 80, 85, and 90 may be made available by the external sources under agreement with an operator of the aggregator 20. Also, the individual users may receive access to the data blocks of the aggregator 20 by subscribing to the services of the aggregator 20.

Figure 2:
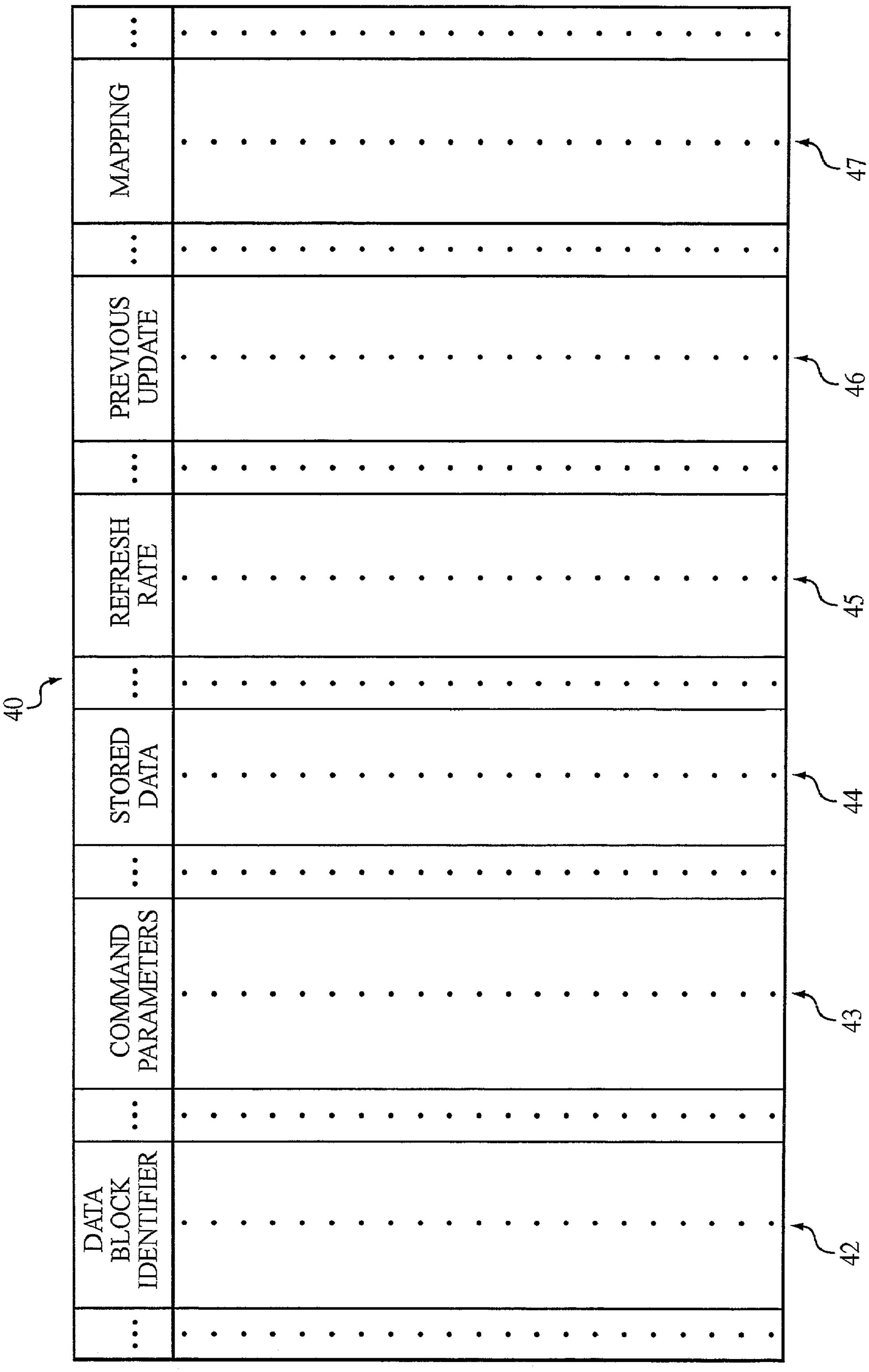
FIG. 2 is an example of the fields that may be included in the database of the aggregator.

The database 40 of the aggregator 20 may have a plurality of fields dedicated to retrieving the desired data blocks from external sources 80, 85, and 90 and then transmitting the data blocks to the user. As shown in FIG. 2, the database 40 may include the following fields: data block identifier 42, command parameters 43, stored data block 44, refresh rate 45, previous update 46, and mapping 47. Referring to both FIGS. 1 and 2, when a command is transmitted to the aggregator 20 for a particular data block, the command is associated with a unique identifier for the data block, and the identifier for each data block is located in the data block identifier field 42. The unique identifier may be a label for the data block having numbers and letters or the identifier may be a label having an actual text description of the data block. The command to the aggregator 20 may also include certain parameters, which correspond to the command parameter field 43. For example, the user's computer system 50 may transmit commands for current weather information for the cities of San Francisco and Paris. Although the data blocks requested are for the current weather information, the parameters for each command may be the city names. The refresh rate field 45 describes how often a particular data block should be updated, and the previous update field 46 describes the last time that particular data block was updated. The stored data block field 44 contains the actual data block. The mapping field 47 describes the mapping sequence that the aggregator program 35 may use to update the particular data block.

When a command is transmitted from a user's computer system 50 to the aggregator 20 requesting a particular data block, the aggregator program 35 associates the command with a unique identifier from the data block identifier field 42, and any parameters that may be included with the command are corresponded to the command parameter field 43. The data block identifier field 42 and the command parameters field 43 together serve to locate the data block in the stored data block field 44 that was requested by the command. The refresh rate field 45 and the previous update field 46 are compared to determine if the actual data block that is saved in the stored data block field 44 needs to be updated from the external source 80, 85, or 90. For example, if a particular data block saved in the stored data block field 44 has a corresponding refresh rate field 45 set to 10 minutes, and the previous update field 46 describes that the last update occurred 2 minutes before the current request, then the data block saved in the stored data block field 44 is valid and may be transmitted back to the user's computer system 50. Then data block may be displayed in the user's computer application 55 as a basis for other operations, such as calculations in a spreadsheet application. However, if the previous update field 46 describes that the last update occurred 15 minutes before the current request, then the data block saved in the stored data block field 44 must be updated before being transmitted to the user's computer system 50.

The aggregator program 35 uses the mapping field 47 of the particular data block saved in the stored data block field 44 to update the data block. The mapping field 47 includes instructions or a mapping sequence for the aggregator program 35 so that the updated data block may be retrieved from the external source 80, 85, or 90. For example, the mapping sequence may include opening a specific internet web page and using a conventional "web scraping" software to extract only a piece of the information shown on the page. Further yet, the mapping sequence may include a direct database query, which instructs the aggregator program 35 to directly access a database of an external data source 80, 85, or 90 and query a particular piece of information. The process used by the aggregator 20 to automatically retrieve information from an external data source 80, 85, or 90 typically will depend upon an agreement between the operator of the aggregator 20 and the external data source. The aggregator program 35 separates the information of the external data source 80, 85, or 90 into pieces of information, and the desired piece of information is retrieved and saved to the stored data block field 44 as an updated data block to replace the old data block. Then the new data block is transmitted to the user's computer system 50.

The external data sources 80, 85, and 90 may include electronic databases, online research reports and statistical data, internet web pages, sensory information, real-time information streams, or other forms of electronic information. The information from the external data sources 80, 85, and 90 may be in a format that includes more information than the user may desire, so the information from the external data sources 80, 85, and 90 is separated into smaller pieces of information, which may be transmitted to the user's computer system 50 as data blocks. For example, a user may desire only a piece of information from a research report of an external data source 80, 85, or 90, so the aggregator 20 may separate portions of the report, such as the conclusion section or a final determination of an important value, into a smaller piece of information that would constitute the data block. Then the user with a subscription to access the data blocks of the aggregator 20 may retrieve only the desired pieces of information from the research report instead of paying a fee for the entire document.

As mentioned previously, the user may retrieve desired information from the external data sources by entering a command in the user's computer application 55. A software tool that enables the user to do this is provided by a Microsoft® Office XP feature known as Smart Tags, which is currently undergoing Beta testing. Smart Tags enables associations between Office XP documents and other resources, such as data blocks. The Smart Tags feature allows an individual computer to be programmed to recognize certain text so that a menu listing associated resources may be opened by the user. This feature may be used to recognize certain text, so a menu of associated data blocks may be listed for the user to select from. The aggregator maintains a list of available data blocks to be transmitted to the user, and a default menu option allows the user to add more listings of data block descriptions to the menu. For example, the user may update the menu listing of the available data blocks by selecting the default option in the menu labeled "browse available data blocks." Selecting this option brings the user to a website that lists the available data blocks. Additional data blocks may be added to the user's menu listing by selecting the additional data blocks from the website. Then the new data blocks are added to the menu listing. After the user selects the desired data block, the command is transmitted to the aggregator 20, and the aggregator transmits the data block to the user's computer application 55 to be displayed for the user.

Figure 3:
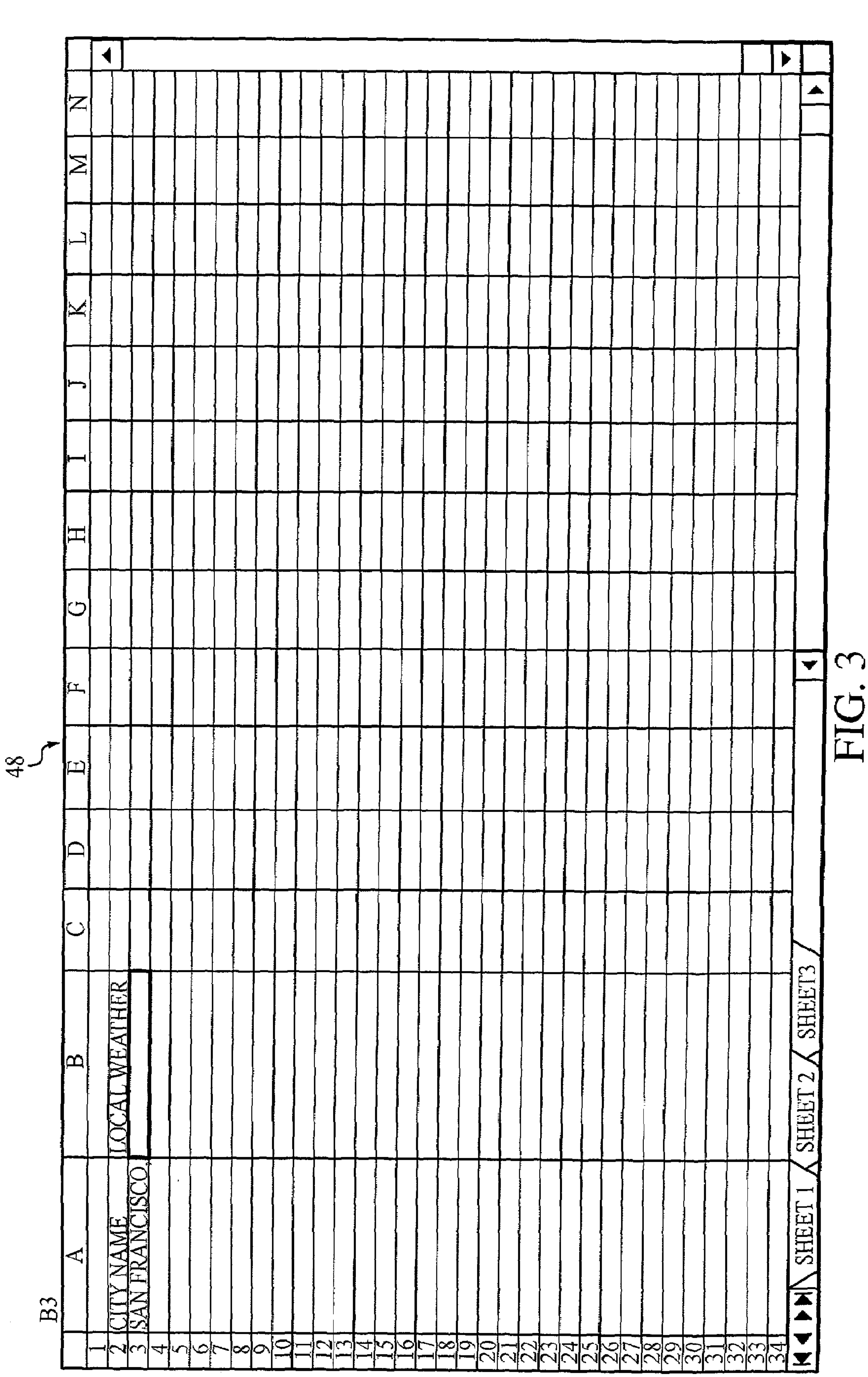
FIGS. 3–7 show one embodiment of how a user may select a data block from the aggregator in accordance with the invention.
Figure 4:
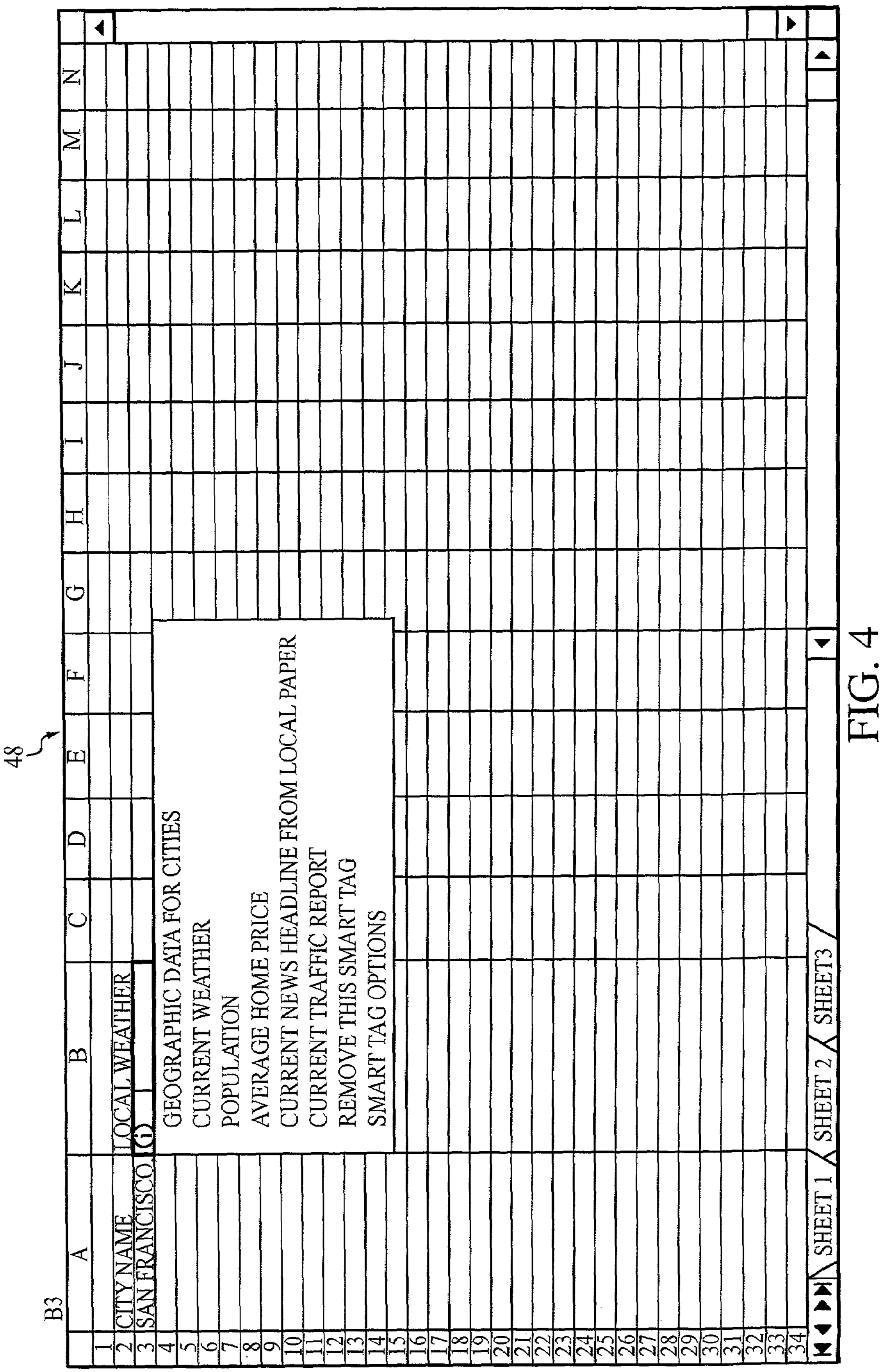
Figure 5:
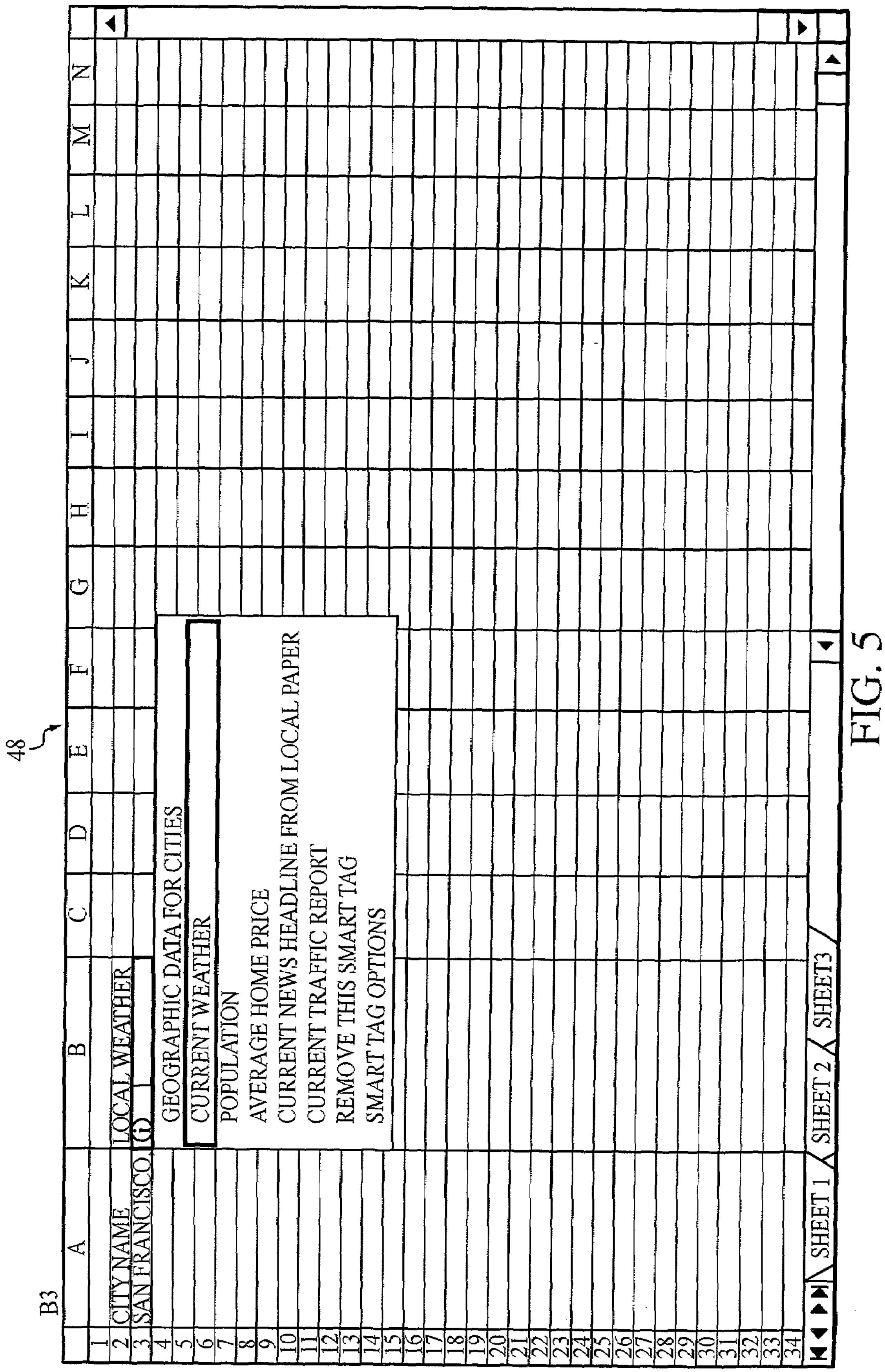
Figure 6:
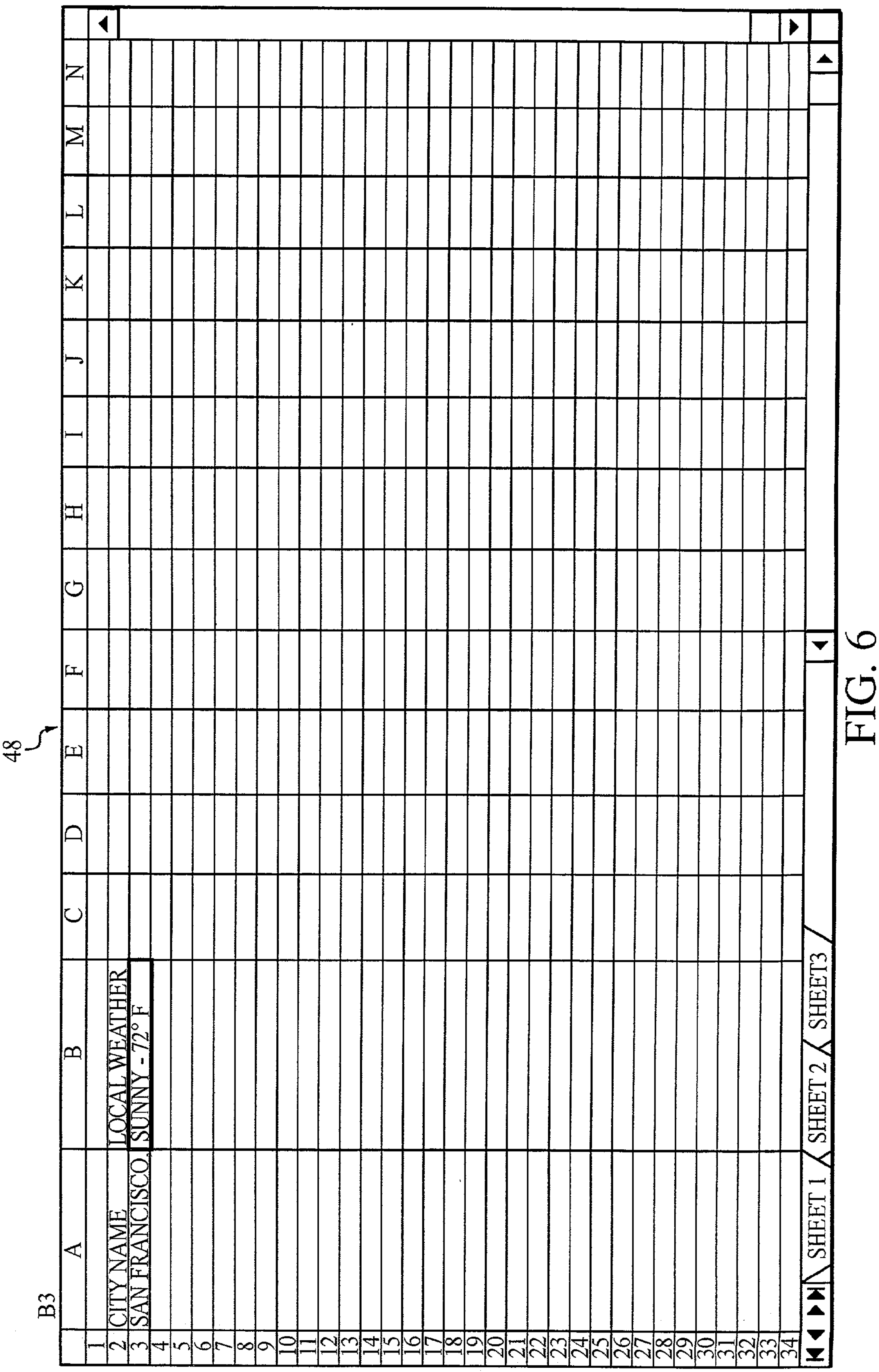
Figure 7:
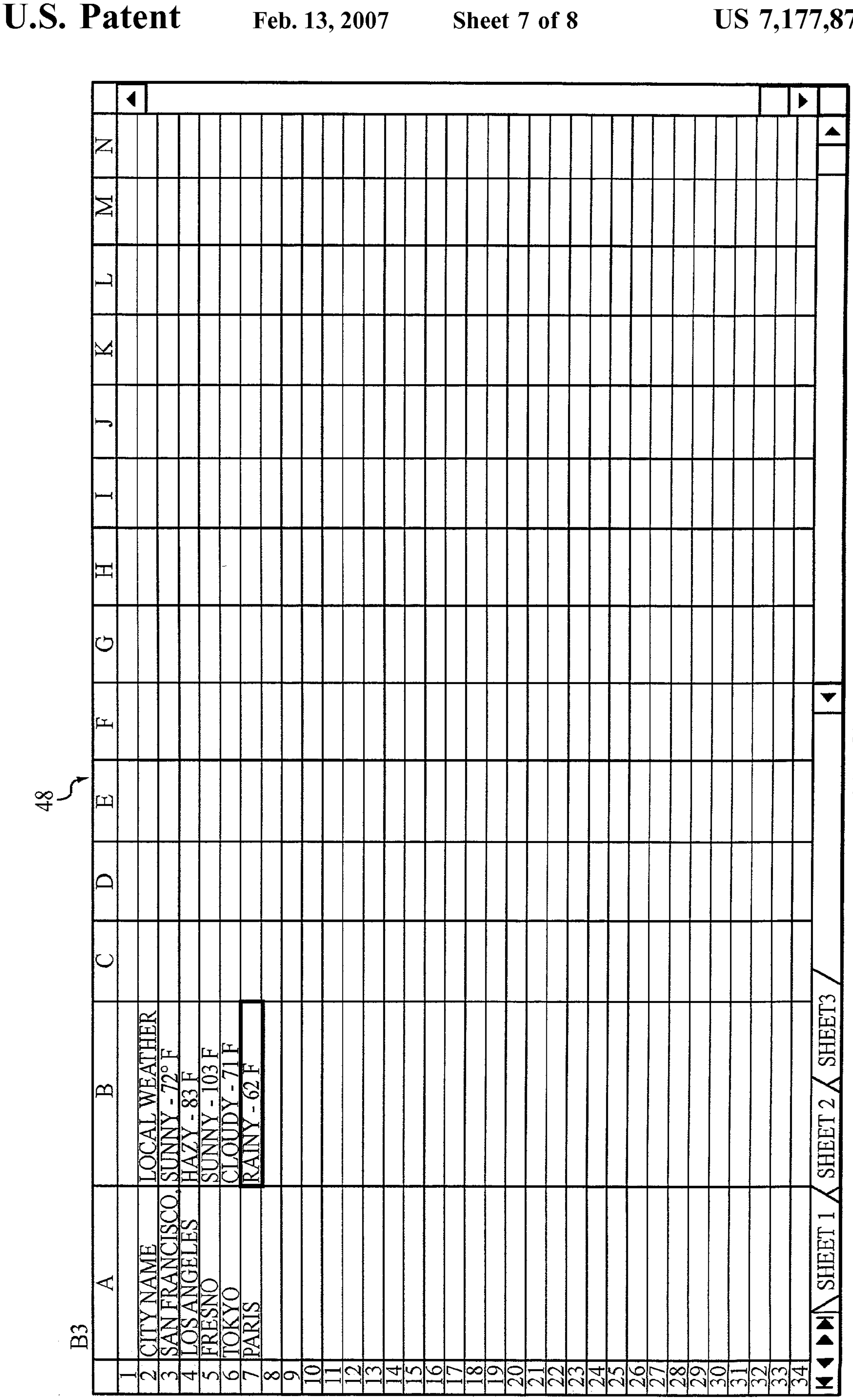

FIGS. 3–7 show an example of how a user selects a data block from the aggregator 20. Referring to FIG. 3, the user wishes to create a spreadsheet showing city names and local weather. The first city name entered into the spreadsheet computer application in this example is "San Francisco." FIG. 4 shows the user employing the Smart Tags feature to enter a command to the aggregator (not shown in FIG. 4). The Smart Tags feature recognizes the text "San Francisco" and a menu listing is shown to the user with descriptions of associated data blocks that may be retrieved. Referring to FIG. 5, the user highlights one of the descriptions for a data block that retrieves the current weather information. When the user selects the "current weather" menu option, a command is transmitted to the aggregator using a network connection from the user's computer system. The aggregator corresponds the command with a unique identifier for a data block of the current weather with the city of San Francisco entered as a parameter. The aggregator then transmits the data block to the user's computer system, and the weather information is displayed for the user in the spreadsheet application, as shown in FIG. 6. Referring to FIG. 7, the spreadsheet of city names and local weather expanded to include other cities and current weather conditions that were retrieved using data blocks from the aggregator. The weather information for each city shown in FIG. 7 may later be updated at various times, for example, when the spreadsheet application is restarted. Then the weather information will be automatically updated by a request to the aggregator 20 that will retrieve the most recent data. The Smart Tags feature is only one example of how a command may be entered to the aggregator, and should not be considered a limitation on the invention.

Data blocks that are input into a computer application may refer to previously input data blocks as parameters. This process is referred to as a chain of data blocks. For example, if a company name is typed into a first cell of a spreadsheet application, then a command may be transmitted to the aggregator to retrieve the stock ticker symbol for that company and input the ticker symbol into a second cell. Next, another command may be transmitted to the aggregator to retrieve the current stock price for that particular ticker symbol and input the stock price into a third cell. Since the data block for the stock price refers to the data block for the ticker symbol, the data blocks are a chain of data blocks. Thus, if the company name in the first cell were changed to a different company name, then the data block in the second cell would be updated by the aggregator to display the ticker symbol for the different company name. Accordingly, the data block in the third cell would be updated to display the current stock price for the updated ticker symbol of the second cell.

Figure 8:
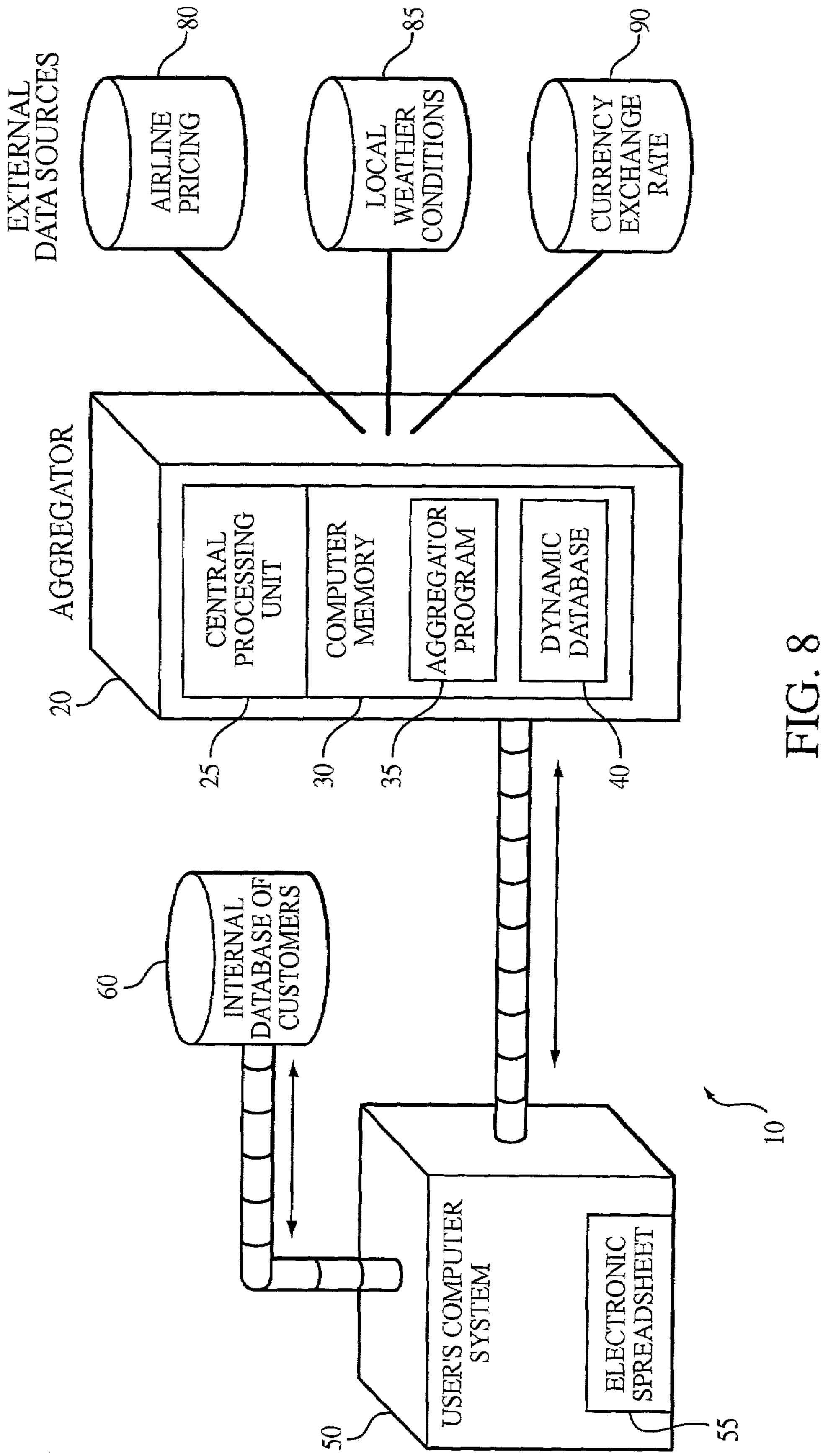
FIG. 8 is a diagram of an example of the information management system using a data block aggregator of FIG. 1.

A diagram of an example of the information management system using a data block aggregator 20 of FIG. 1 is shown in FIG. 8. In this example of the invention, the user wishes to create an electronic spreadsheet 48 of customer locations, airline pricing for flights to the customer locations from the user's home city, local weather conditions at the customer locations, and the currency exchange rate at the customer locations. As is conventional, the user may use the internal database software to export the customer locations data from the internal database 60 to a spreadsheet format. The user's computer system 50 may retrieve data from the internal database 60, which may be used in combination with the aggregator 20 for simplifying access to data, but the internal database 60 is not a requirement of the invention. Next, the user must input the price for flights to the customer locations in the spreadsheet application 55. Instead of using an external source 80, such as an internet website, to research and retrieve the airline pricing for the individual locations, the user simply enters a command into the spreadsheet application 55. The user may issue the command in various ways, such as typing the command into a cell in the spreadsheet or employing the previously described Smart Tags feature. The command may include parameters, such as travel dates and name of airline, while referring to the customer location previously input into the spreadsheet as the arrival city. The entered command is transmitted to the aggregator 20. The desired airline pricing information is automatically retrieved and separated into data blocks by the aggregator 20, and the aggregator 20 responds by transmitting at least one data block with the appropriate airline pricing information to the user's computer system 50. The airline pricing information is displayed in the spreadsheet application 55, and pricing information for an additional airline may be displayed by entering an additional command.

The user may have the local weather conditions displayed in the spreadsheet application 48 by entering a command similar to the process shown in FIGS. 3–7. Again, the command for the local weather conditions may refer to the customer location that was previously input into the cells of the spreadsheet. The need to research and retrieve the local weather conditions for each customer location by the user is eliminated since the user simply enters a command for each customer location. Similarly, the currency exchange rate for each customer location may be input into the spreadsheet by entering a command in the electronic spreadsheet application 55 requesting such information from the aggregator 20. The airline pricing, local weather conditions, and currency exchange rates may change on a daily basis, so the information displayed in the spreadsheet may be automatically updated since the information is linked to data blocks that are updated by the aggregator 20, as previously described. The spreadsheet may be updated by settings in the computer application 55 to automatically request updated data blocks from the aggregator 20, or the application 55 may have a function that lets the user manually request to update all data blocks from the aggregator 20.

The previous example is only one example of how the method of data block aggregation may be used to enable the quick discovery and simplified retrieval of data in a usable format, and the example should not be considered limiting in any way. There are many instances when a user may benefit from the use of data block aggregation, such as when the user may desire data that is costly or difficult to find. In another instance, the user may have recurring needs for a single piece of information in a computer application, or the required data may be dynamic, which continually changes with time. The example shown in FIG. 8 describes how the method of data block aggregation may be used for access of airline pricing data, local weather data, and currency exchanges rate data, but the current invention may be applied to data from other industries. For example, the method of data block aggregation may be applied to business industry data, such as data on companies, products, pricing, production, and market research. Also, the automotive industry may use the current invention to enable quick discovery and simplified retrieval of information, such as data on wholesale and retail pricing, data on automobile efficiency and safety, or data on vehicle sales. Similarly, the current invention may be applied to information from the real estate industry, the sports and gaming industry, the energy and fuel industry, and the data monitoring industry.

A number of embodiments of the invention have been described. Nevertheless, it will be understood that various modifications may be made without departing from the spirit and scope of the invention. For example, the data blocks transmitted from the aggregator to the user may include numerical data, text data, or a combination of both. Also, the aggregator may transmit data blocks to multiple users at the same time. A further embodiment of the invention may include users that are connected to the aggregator using a wireless network connection. Further yet, computer applications that use the data block aggregation to input data may be applications other than an electronic spreadsheet application, such as a word processing application, a computer programming application, a presentation application, or a publishing application. Accordingly, other embodiments are within the scope of the previously described invention.

What is claimed is:

1. A method for providing blocks of data to a remote computer system for insertion into a computer-generated document residing on the remote computer system, the method comprising:

identifying, in a central network-accessible computer system, a plurality of blocks of data, a source for obtaining current data for each of the blocks of data, and an identifier that uniquely identifies each of the blocks of data; and in response to a request initiated from within a computer-generated document residing on the remote computer and received by the central network-accessible computer system for current data for a specified one of the plurality of blocks of data, transmitting the requested current data for the block of data from the central network-accessible computer system to the remote computer system for insertion into a user selectable location in the computer-generated document residing on the remote computer system.

2. The method of claim 1, wherein the central network-accessible computer system periodically retrieves or receives, from an external data source, the current data for each of the blocks of data.

3. The method of claim 2, wherein:

the current data for one of the plurality of data blocks are retrieved or received in response to the receipt of a request at the central network-accessible computer system from the remote computer system for the current data for the one of the plurality of data blocks; and after the current data for the one of the plurality of data blocks are thus retrieved or received, the current data for the one of the plurality of data blocks are transmitted from the central network-accessible computer to the remote computer system.

4. The method of claim 2, wherein the current data for one of the plurality of data blocks are retrieved upon the expiration of a refresh timer associated with the one of the plurality of data blocks, and the thus retrieved current data are stored in memory at the central network-accessible computer.

5. A network-accessible central computer system for providing blocks of data to a remote computer system for insertion into a computer-generated document residing on the remote computer system, the network-accessible central computer system comprising:

a database comprising a plurality of entries relating to a plurality of blocks of data, each database entry comprising an identification of the block of data, a source for obtaining current data for the block of data, and an identifier that uniquely identifies the block of data; and software code that when executed causes, in response to a request initiated from within a computer-generated document residing on the remote computer and received by the central network-accessible computer system for the current data for one of the plurality of blocks of data, a transmission of the current data for the requested block of data to the remote computer system for insertion into a user selectable location in the computer-generated document residing on the remote computer system.

6. The network-accessible computer system of claim 5, further comprises software code that when executed causes the retrieval or the receipt, from an external data source, of the current data for each of the blocks of data.

7. The network-accessible computer system of claim 6, wherein:

the current data for one of the plurality of data blocks are retrieved or received in response to the receipt of a request at the central network-accessible computer system from the remote computer system for the current data for the one of the plurality of data blocks; and after the current data for the one of the plurality of data blocks are thus retrieved or received, the current data for the one of the plurality of data blocks are transmitted from the central network-accessible computer to the remote computer system.

8. The network-accessible computer system of claim 6, wherein the current data for one of the plurality of data blocks are retrieved or received upon the expiration of a refresh timer associated with the one of the plurality of data blocks, and the thus retrieved or the received current data are stored in memory at the central network-accessible computer.

9. A computer program product tangibly embodied in a computer readable storage medium, the computer program product including instructions that when executed cause a processor to perform operations comprising:

identify, in a central network-accessible computer system, a plurality of blocks of data, a source for obtaining current data for each of the blocks of data, and an identifier that uniquely identifies each of the blocks of data; and in response to a request initiated from within a computer-generated document residing on the remote computer and received by the central network-accessible computer system for current data for a specified one of the plurality of blocks of data, transmit the requested current data for the block of data from the central network-accessible computer system to the remote computer system for insertion into a user selectable location in the computer-generated document residing on the remote computer system.

10. The computer program product of claim 9, further comprising instructions that when executed cause the processor to perform operations including periodically retrieve or receive, from an external data source, the current data for each of the blocks of data.

11. The computer program product of claim 10, wherein:

the current data for one of the plurality of data blocks are retrieved or received in response to the receipt of a request at the central network-accessible computer system from the remote computer system for the current data for the one of the plurality of data blocks; and after the current data for the one of the plurality of data blocks are thus retrieved or received, the current data for the one of the plurality of data blocks are transmitted from the central network-accessible computer to the remote computer system.

12. The computer program product of claim 10, wherein the current data for one of the plurality of data blocks are retrieved upon the expiration of a refresh timer associated with the one of the plurality of data blocks, and the thus retrieved current data are stored in memory at the central network-accessible computer.

13. The computer program product of claim 9, wherein the computer generated document resides on the remote computer system such that the document is editable by a user of the remote computer system.

14. The method of claim 1, wherein the computer generated document resides on the remote computer system such that the document is editable by a user of the remote computer system.

15. The network-accessible computer system of claim 5, wherein the computer generated document resides on the remote computer system such that the document is editable by a user of the remote computer system.

16. The method of claim 1, wherein the computer-generated document is displayed on the remote computer system and is viewable by a user of the remote computer system.

17. The method of claim 16, wherein the computer-generated document is a user-editable document displayed on the remote computer system, the user-editable document being selected from a group consisting of: a spreadsheet document, a word processing document, a presentation document, and a publishing document.

18. The method of claim 17, wherein the request is initiated by a user of the remote computer system by selection of a menu option that is displayed on the remote computer system.

19. The method of claim 18, wherein the displayed menu option is indicative of one of the blocks of data available in the central network-accessible computer system.

20. The method of claim 16, wherein the block of data transmitted from the central network-accessible computer system and inserted into the computer-generated document is displayed on the remote computer system.

21. The method of claim 20, wherein the block of data is inserted into the computer-generated document at a location selected by the user of the remote computer system.

22. The network-accessible central computer system of claim 5, wherein the computer-generated document is displayed on the remote computer system and is viewable by a user of the remote computer system.

23. The network-accessible central computer system of claim 22, wherein the computer-generated document is a user-editable document displayed on the remote computer system, the user-editable document being selected from a group consisting of: a spreadsheet document, a word processing document, a presentation document, and a publishing document.

24. The network-accessible central computer system of claim 23, wherein the request is initiated by a user of the remote computer system by selection of a menu option that is displayed on the remote computer system.

25. The network-accessible central computer system of claim 24, wherein the displayed menu option is indicative of one of the blocks of data available in the database.

26. The network-accessible central computer system of claim 22, wherein the block of data transmitted from the central network-accessible computer system and inserted into the computer-generated document is displayed on the remote computer system.

27. The network-accessible central computer system of claim 26, wherein the block of data is inserted into the computer-generated document at a location selected by the user of the remote computer system.

28. The computer program product of claim 9, wherein the computer-generated document is displayed on the remote computer system and is viewable by a user of the remote computer system.

29. The computer program product of claim 28, wherein the computer-generated document is a user-editable document displayed on the remote computer system, the user-editable document being selected from a group consisting of: a spreadsheet document, a word processing document, a presentation document, and a publishing document.

30. The computer program product of claim 29, wherein the request is initiated by a user of the remote computer system by selection of a menu option that is displayed on the remote computer system.

31. The computer program product of claim 30, wherein the displayed menu option is indicative of one of the blocks of data available in the central network-accessible computer system.

32. The computer program product of claim 28, wherein the block of data transmitted from the central network-accessible computer system and inserted into the computer-generated document is displayed on the remote computer system.

33. The computer program product of claim 32, wherein the block of data is inserted into the computer-generated document at a location selected by the user of the remote computer system.

34. A method for inserting a data block from a server computer system into a computer-generated document residing on a client computer system, the method comprising:

initiating a request for at least one data block in a network-accessible server computer system, the request being initiated from within a computer-generated document residing on a client computer system, wherein the computer generated document is displayed on the client computer system and is editable by a user of the client computer system;

transmitting the request to the network-accessible server computer system;

receiving the requested data block from the server computer system; and inserting the data block at a location in the computer-generated document selected by the user of the client computer system such that the data block is displayed on the client computer system.

35. The method of claim 34, wherein the computer-generated document is selected from a group consisting of: a spreadsheet document, a word processing document, a presentation document, and a publishing document.

36. The method of claim 34, further comprising selecting a menu option from a menu displayed on the client computer system so as to initiate the request for the data block.

37. The method of claim 36, wherein the displayed menu option is indicative of one of a plurality of data blocks available in the network-accessible server computer system.

38. The method of claim 36, wherein the menu is displayed on the client computer system at a location selected by a user of the client computer system so that the data block is inserted into the computer-generated document proximal to the display location of the menu.

39. The method of claim 34, wherein the network-accessible server system comprises a database comprising a plurality of entries relating to a plurality of data blocks.

* * * * *